United States Patent [19]
Schwinke

[11] Patent Number: 6,032,054
[45] Date of Patent: Feb. 29, 2000

[54] VEHICLE TELECOMMUNICATION APPARATUS WITH RF ANTENNA SWITCHING ARRANGEMENT

[75] Inventor: Steven P. Schwinke, Plymouth, Mich.

[73] Assignee: General Motors Corporation, Detroit, Mich.

[21] Appl. No.: 09/064,080

[22] Filed: Apr. 22, 1998

[51] Int. Cl.$^7$ ........................................................ H04B 1/38
[52] U.S. Cl. .............................. 455/557; 455/575; 455/99; 455/345
[58] Field of Search ................................. 455/345, 346, 455/347, 348, 349, 351, 550, 556, 557, 456, 457, 575, 552, 99, 569, 571; 379/93.11, 428

[56] References Cited

U.S. PATENT DOCUMENTS

| | | | |
|---|---|---|---|
| 5,202,913 | 4/1993 | Lang et al. | 455/345 |
| 5,418,836 | 5/1995 | Yazaki | 455/569 |
| 5,479,479 | 12/1995 | Braitberg et al. | 455/557 |
| 5,537,673 | 7/1996 | Nagashima et al. | 455/346 |
| 5,574,987 | 11/1996 | Wallace | 455/82 |
| 5,594,394 | 1/1997 | Sasaki et al. | 333/103 |
| 5,797,088 | 8/1998 | Stamegna | 455/345 |

*Primary Examiner*—Dwayne D. Bost
*Assistant Examiner*—Quochien B. Vuong
*Attorney, Agent, or Firm*—Anthony Luke Simon; Robert M. Sigler

[57] ABSTRACT

Vehicle telecommunication apparatus permits sharing of an embedded antenna between an embedded transceiver used for the provision of mobile application services to the vehicle and a portable transceiver used for personal communication by the vehicle operator. Closure of a mobile vehicle use switch, such as a vehicle ignition switch, with the portable transceiver connected to an embedded RF terminal, places an electrically controlled RF switch in an activated condition providing a through connection between the portable transceiver and embedded antenna for transmission and reception and a coupled connection from the embedded antenna for reception by the embedded transceiver. A generated RF signal from the embedded transceiver is coupled to a detector to switch the electrically controlled RF switch to its inactivated condition, in which the portable transceiver is disconnected from the embedded antenna and a through signal path is established between the embedded transceiver and embedded antenna. The inactivated condition of the electrically controlled RF switch is also produced its own failure, by opening the mobile vehicle use switch or by disconnecting the portable transceiver. The antenna sharing provides better reception and transmission in the use of the portable transceiver for calls from the vehicle while allowing the portable transceiver to be removed from the vehicle by the operator for use outside the vehicle with the embedded antenna connected to the embedded transceiver for receipt of mobile application services from a service center.

8 Claims, 5 Drawing Sheets

VEHICLE TELECOMMUNICATION APPARATUS WITH RF ANTENNA SWITCHING ARRANGEMENT

TECHNICAL FIELD

The technical field of the invention is vehicle telecommunications.

BACKGROUND OF THE INVENTION

The development of wireless telecommunications has enabled the provision of mobile application services to vehicles by mobile application service providers such as OnStar®. Call-in service for Global Positioning System (GPS) determined vehicle location or directions to a desired vehicle destination, tracking of stolen vehicles, automatic notification of supplemental inflatable restraint (SIR) activation with dispatch of emergency services, and notification of a vehicle security system violation are examples of the mobile application services now available to properly equipped vehicles; and such mobile application services have provided improved convenience and security to vehicle operators.

Vehicles receiving such services are equipped with a wireless telecommunication system having an embedded transceiver and an embedded antenna capable of exchanging voice and data transmissions with an external transceiver connected in a telecommunications network, such as e.g. a cellular telephone network. Such systems typically include a handset available as voice interface between the vehicle operator and the embedded transceiver but may, alternatively or additionally, include an embedded microphone and speaker for "hands-free" voice communication. The systems may also provide general dialing capability for personal telephone calls over a public switched telephone network. But all external communication, whether voice or data, is maintained through the embedded transceiver and embedded antenna; and general dialing capability is thus restricted to calls to or from the vehicle.

It is also well known for a vehicle operator to carry a personal, portable transceiver such as a portable cellular or PCS telephone for personal telephone calls. Many such telephones are small and easily portable in a pocket or purse, but they are not ideal for calls from a vehicle. They have low gain antennas which, when used in the vehicle, are hampered in transmission and reception by the surrounding vehicle structure. In transmission, they are further limited in range by a transmitter considerably less powerful than that of a (typically) 3 watt embedded cellular transceiver, due to the portable transceiver's small size and need for battery powered operation when removed from the vehicle. In areas of marginal signal strength, a vehicle operator might have to stop and exit the vehicle in order to place a personal call from such a portable transceiver.

SUMMARY OF THE INVENTION

This invention modifies the prior art apparatus and systems described above to permit a portable transceiver to share an embedded antenna with an embedded transceiver while in a vehicle. Such sharing provides better reception and transmission in the use of the portable transceiver for calls from the vehicle while allowing the portable transceiver to be removed from the vehicle by the operator for use outside the vehicle. The invention, however, further provides for automatic interruption of antenna sharing when the embedded transceiver requires the embedded antenna in the provision of mobile application services.

The apparatus provides an embedded transceiver, an embedded antenna and an embedded radio frequency terminal on the vehicle, with a portable transceiver having an integrated antenna and an external radio frequency terminal removably connected to the embedded radio frequency terminal on the vehicle. The apparatus provides radio frequency switch apparatus having an activated condition connecting the embedded antenna to the embedded radio frequency terminal and an inactivated condition connecting the embedded antenna to the embedded transceiver and disconnecting the embedded antenna from the embedded radio frequency terminal. The apparatus further provides apparatus which couples a received radio frequency signal from the embedded antenna to the embedded transceiver when the radio frequency switch apparatus is in its activated condition and apparatus responsive to a radio frequency signal generated by the embedded transceiver for switching the radio frequency switch apparatus to its inactivated condition.

In a preferred embodiment, the apparatus that couples a received radio frequency signal from the embedded antenna to the embedded transceiver comprises a directional coupler and an additional electrically controlled radio frequency switch controlled together with the electrically controlled radio frequency switch mentioned above to provide the coupled signal from the directional coupler to the embedded transceiver only in an activated condition. Preferably, the apparatus that switches the electrically activated radio frequency switch means to its inactivated condition comprises an additional directional coupler coupling signals only from the embedded transceiver to a detector.

In a preferred embodiment, the vehicle further preferably has a mobile vehicle use switch, such as a standard vehicle ignition switch, having alternative enabling and disabling conditions indicating the state of vehicle readiness for use. The telecommunication system preferably responds to the enabling condition of this switch together with the connection of the portable transceiver to the embedded radio frequency terminal to place the electrically controlled radio frequency switch means in its activated condition. Thus, the portable transceiver, providing it is connected, is automatically connected to the embedded antenna when the vehicle is conditioned for use.

The telecommunication system preferably further responds to the disconnection of the portable transceiver from the embedded radio frequency terminal by placing the electrically controlled radio frequency switch means in its inactivated condition. Thus, the system automatically reverts to a state facilitating communication between the vehicle and mobile application service center when the portable transceiver is removed from the vehicle.

The telecommunication system preferably further responds to operator placement of the portable transceiver, connected to the embedded radio frequency terminal, in an on state with the mobile vehicle use switch in its disabling condition, by placing the electrically controlled radio frequency switch means in its activated condition if the portable transceiver is put into use within a predetermined time period. Once the portable transceiver is thus put into use, the telecommunication system preferably maintains the electrically controlled radio frequency switch means in its activated condition for the duration of the use. Thus, a vehicle operator may initiate and complete a call on the portable transceiver using the embedded antenna without placing the vehicle in condition for use.

DESCRIPTION OF THE PREFERRED EMBODIMENT

Figure 1:
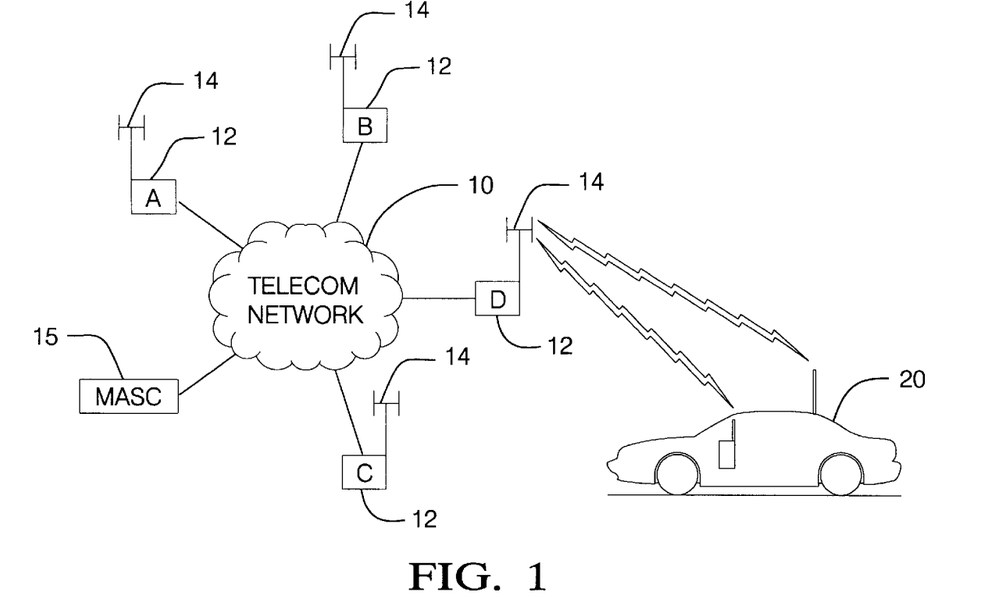
FIG. 1 shows a vehicle with a telecommunication system according to the invention communicating with a telecommunications network.

As shown in FIG. 1, a telecommunications network 10 is provided with a plurality of transceivers 12, with antennas 14, capable of establishing and maintaining a telecommunications relationship with a vehicle 20. The relationship may be based on the cellular model in which each of transceivers 12 covers a predetermined area or cell and vehicle 20 is handed off from one to another as it proceeds from one cell to the next. Network 10 may include land lines as well as microwave and/or other telecommunication links and includes a public switched telephone network as well as an SS7 or other signaling network. A mobile application service center (MASC) 15, such as the previously described OnStar®, is connected to network 10 to provide mobile application services to vehicle 20, along with other subscribing vehicles, operating in communication with network 10. In FIG. 1, vehicle 20 is communicating with telecommunications network 10 through the antenna 14 and transceiver 12 labeled "D."

Figure 2:
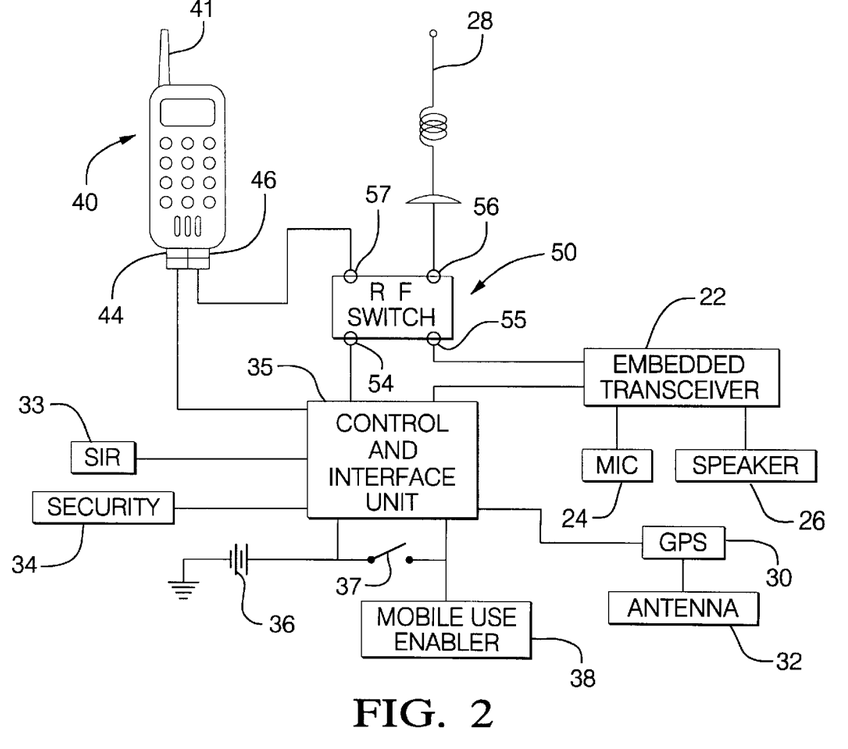
FIG. 2 is a block diagram of the vehicle telecommunication system in the vehicle of FIG. 1.

FIG. 2 shows a block diagram of vehicle 20 with its telecommunication apparatus and other relevant systems. An embedded transceiver 22 is connected to an embedded microphone 24 and an embedded speaker 26 in vehicle 20 and is further connected through an RF switch 50 to access an embedded antenna 28 in a manner to be described below. Microphone (MIC) 24 and speaker 26 are permanently mounted in vehicle 20 in locations enabling "hands free" voice communication by the vehicle operator through embedded transceiver 22. Embedded antenna 28 is designed with a high gain and is permanently mounted on vehicle 20 in an optimal location, preferably on the outside of the vehicle for a clear transmission and reception path. In a preferred embodiment of the invention, embedded transceiver 22 and embedded antenna 28 are designed for operation in the cellular band.

Vehicle 20 is provided with a global positioning system (GPS) 30 having an appropriate GPS antenna 32. GPS 30 receives signals from earth satellites to generate accurate position data for vehicle 20 for transmission to MASC 15 in the provision of mobile application services to vehicle 20. A control and interface unit 35 interfaces GPS 30 with embedded transceiver 22; the unit requests and stores GPS data from GPS 30 and provides the data in proper form to embedded transceiver 22 for transmission to MASC 15. Control and interface unit 35 may include a microcomputer which is programmed to perform the required data handling operations, as well as other control functions to be described.

Vehicle 20 may include a plurality of vehicle systems which may be monitored for the detection of predetermined vehicle events. One such system in this embodiment is a Supplemental Inflatable Restraint (SIR) system 33. SIR system 33 includes a crash sensor, not shown, which is effective in a vehicle crash to initiate activation of one or more inflatable restraints. A link is provided from SIR system 33 to control and interface unit 35 so that a signal from the crash sensor activating the inflatable restraints also initiates a crash alert data call from the vehicle by embedded receiver 22 to MASC 15. In response to such a call, MASC 15 may dispatch emergency services to the vehicle at a location determined from GPS position data communicated from vehicle 20 to MASC 15.

Another vehicle system that may be monitored is a vehicle security system 34. Such a system may be responsive, by means known in the art, to an unauthorized vehicle activation or break-in to detect a security violation. Control and interface unit 35 may be responsive to such an event to call MASC 15 with a security data message, whereupon MASC 15 may track the position of vehicle 20 through repeatedly updated GPS position data provided from vehicle 20 through embedded transceiver 22. The process may be "silent," in that thief does not know the vehicle is being tracked. Other vehicle systems may also be monitored, with a call automatically placed to MASC 15 by control and interface unit 35 through embedded transceiver 22 upon the detection of a predetermined event.

Vehicle 20 is also provided with a portable transceiver 40 having its own antenna 41. Transceiver 40 is a fully functional wireless transceiver, such as a cellular telephone, which may be easily removed from vehicle 20 and used as a personal communication device over telecornmunications network 10 by the vehicle operator away from the vehicle. But transceiver 40 is provided with a plurality of external power and data terminal connections shown in FIG. 2 as a power and data connector 44, through which a removable connection is made to control and interface unit 35 in vehicle 20. Portable transceiver 40 is also provided with an external radio frequency (RF) connector 46, through which a removable connection is made to a radio frequency (RF) terminal 57, embedded in vehicle 20, for access to embedded antenna 28 in a manner to be described. Connectors 44 and 46 are physically linked or coordinated so that RF signal, control data and power connections are made or unmade together as portable transceiver 40 is connected or disconnected from the telecommunication system in vehicle 20.

A standard vehicle DC power supply 36 includes the battery shown as well as an alternator and voltage regulator, not shown, to provide a somewhat regulated DC voltage in the normal manner. Vehicle systems such as SIR apparatus 33 and security apparatus 34 receive power from power supply 36 in the normal manner. Control and interface unit 35 is also powered by vehicle power supply 36 at all times and itself conditions and controls the power to the rest of the telecommunication apparatus, such as embedded transceiver 22 with microphone 24 and speaker 26, GPS 30 and RF switch 50. Vehicle 20 is preferably provided with a mobile vehicle use switch 37, which controls electric power to a mobile use enabler 38. By controlling the application of electric power to mobile use enabler 38, mobile use switch 37 allows or prevents mobile use of the vehicle; and a lock associated with mobile use switch 37 prevents mobile use of the vehicle by unauthorized persons. Thus, mobile use switch 37 indicates the state of mobile use enablement of vehicle 20. In a vehicle with a spark-ignited internal combustion engine, for example, mobile use switch 37 may be a standard ignition switch, requiring an ignition key, and mobile use enabler 38 may be the engine ignition system. An electric vehicle may have a similar control switch for the application of electric power to the electric propulsion apparatus. In another vehicle, a similar switch may control an electrically activated steering lock. In any of the above described embodiments, a vehicle operator uses a key, not shown, to place switch 38 in a disabling condition, open in this embodiment, corresponding to disabling of vehicle use or an alternative enabling condition, closed in this embodiment, corresponding to enabling of mobile vehicle use. Alternatively, switch 37 may be activated as a result of operator activation of a mechanical vehicle use enabler, such as shifting an automatic transmission between "park" and a vehicle operating condition such as "drive" or actuating a vehicle parking brake. In this case, mobile use switch 37 is only indicative of mobile use enabling rather than being the cause thereof. In any case, however, mobile use switch 37 provides a signal of the enabling or disabling of mobile vehicle use to control and interface unit 35.

In vehicle 20, a radio frequency (RF) switch apparatus 50 provides sharing of embedded antenna 28 by embedded transceiver 22 and portable transceiver 40. RF switch apparatus 50 has permanent connections through terminal 54 to control and interface unit 35, through terminal 55 to embedded transceiver 22 and through terminal 56 to embedded antenna 28, as well as through terminal 57 to portable transceiver 40 when the latter is connected. Terminals 55–57 are radio frequency terminals capable of connecting coaxial cables for the radio frequency signals (e.g. 800–900 MHz) used in wireless telecommunications. Terminal 54 provides DC electric power to RF switch 50 under control of control and interface unit 35.

Figure 3:
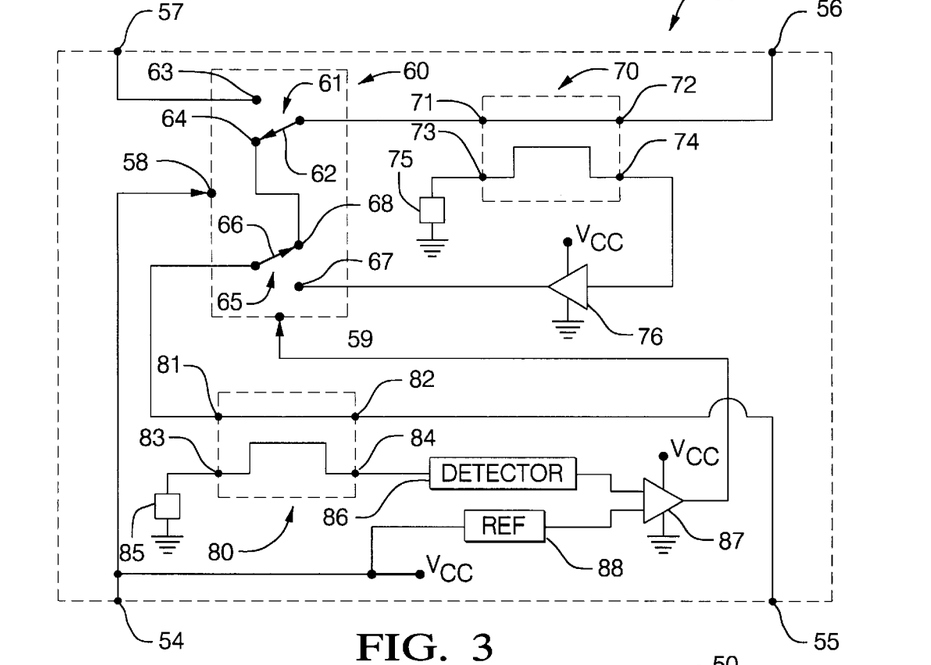
FIG. 3 shows an RF switch apparatus in the telecommunication system of FIG. 2 with electrically controlled switch means in an inactivated condition.
Figure 4:
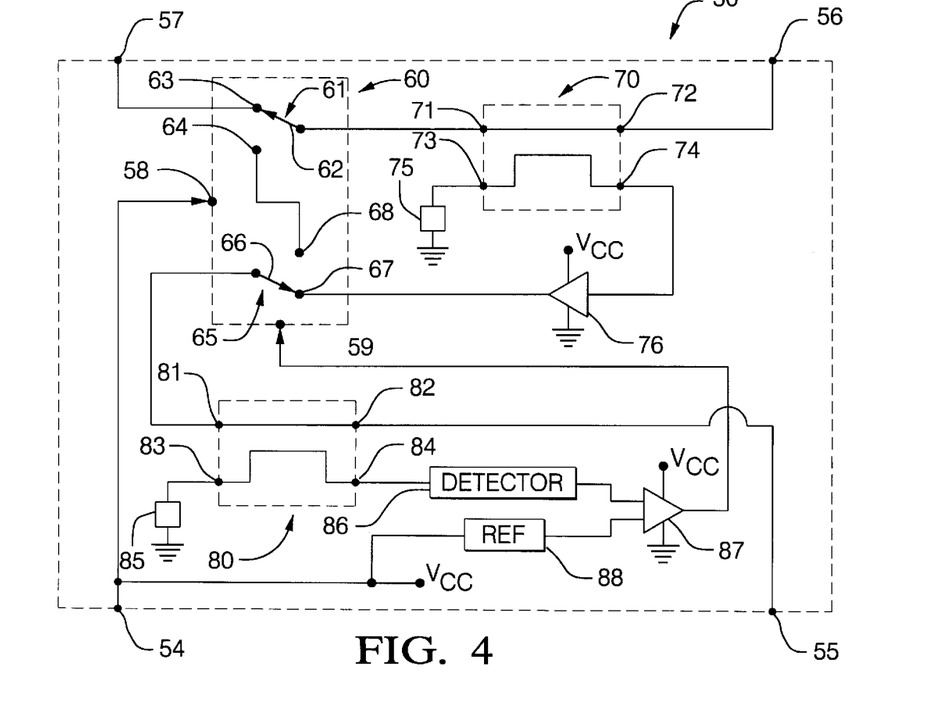
FIG. 4 shows an RF switch apparatus in the telecommunication system of FIG. 2 with electrically controlled switch means in an activated condition.

RF switch apparatus 50 is shown in greater detail in FIGS. 3 and 4. An electrically controlled radio frequency switch unit 60 comprises a pair of switches 61 and 65 designed to switch radio frequency signals. Switch unit 60 has an inactivated condition, with switches 61 and 65 as shown in FIG. 3, to which it returns whenever it is not electrically activated, and an activated condition with switches 61 and 65 as shown in FIG. 4. Except for the alternative inactivated and activated conditions of switch unit 60, FIGS. 3 and 4 are identical.

Switch 61 of switch unit 60 comprises an armature 62 connected alternatively to a contact 63 in the activated condition and to a contact 64 in the inactivated condition. Switch 65 of switch unit 60 comprises an armature 66 connected alternatively to a contact 67 in the activated condition and to a contact 68 in the inactivated condition. A power input terminal 58 of switch unit 60 is connected to terminal 54 of RF switch 50, directly as shown or through optional power conditioning circuitry, to enable activation of switch unit 60 when electric power is provided to terminal 54 by control and interface unit 35. A control terminal 59 of switch unit 60 allows switch unit 60 to be switched thereby between the activated and the inactivated condition while power is still provided to terminal 58; but the removal of DC power from terminal 58 will place switch unit 60 in the inactivated condition regardless of the voltage on terminal 59.

Figure 5:
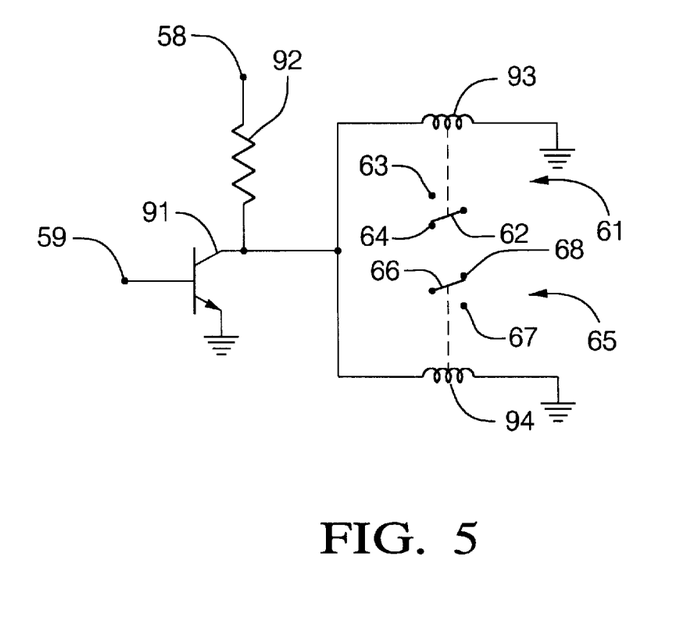
FIG. 5 shows a circuit diagram of one embodiment of electrically controlled switch means for use in the apparatus of FIGS. 3–4.

Switch unit 60 may be realized in a variety of different technologies well known to those skilled in the art of electrical switching circuits and devices. An example using electromechanical relays is shown in FIG. 5. Power terminal 58 is connected through a load resistor 92 to the collector of a grounded emitter NPN transistor 91 having a base connected to control terminal 59. Switches 61 and 65 are relays having activating coils 93 and 94 respectively; and the collector of transistor 91 is connected through coils 93 and 94 in parallel to ground. Coil 93 controls armature 62 of switch 61; while coil 94 controls armature 66 of switch 65. Alternatively, coils 93 and 94 could equivalently be replaced by a single coil activating both armatures 62 and 66 simultaneously. With no DC electric power provided on terminal 58, both relays remain in an inactivated condition, regardless of the voltage on terminal 59. However, a sufficient DC voltage on terminal 58 provides biasing for transistor 91, which can then be turned on or off in response to the voltage on terminal 59. With a high voltage on terminal 59 and transistor 91 full on, its collector is at a low voltage; and the relays remain in an inactivated condition as shown in FIG. 5. However, with a low voltage on terminal 59 and transistor 91 off, current flows through resistor 92 and coils 93 and 94 to activate the relays.

Returning to FIG. 3 or 4, switch contact 63 is connected to RF terminal 57, and thus to portable transceiver 40 when the latter is connected. Switch contacts 64 and 68 are connected together. Armature 62 is connected to a through terminal 71 of a directional coupler 70, the other through terminal 72 of which is connected to RF terminal 56, and thus to embedded antenna 28. Terminal 73 of directional coupler 70 is connected through an impedance 75 to ground; and terminal 74 is connected through an amplifier 76 to switch contact 67. Armature 66 is connected to a through terminal 81 of a directional coupler 80, the other through terminal 82 of which is connected to RF terminal 55, and thus to embedded transceiver 22. A terminal 83 of directional coupler 80 is connected through an impedance 85 to ground. A terminal 84 of directional coupler 80 is connected through a detector circuit 86 to one input of a comparator 87, the other input of which receives a reference voltage REF from a reference voltage generator 88 and the output of which provides a switching signal to control terminal 59 of switch unit 60. Amplifier 76, detector 86, reference voltage generator 88 and comparator 87, as well as electrically controlled switch unit 60, are all powered by DC power from terminal 54, either directly or through optional power conditioning circuitry.

Referring to FIG. 4, switch unit 60 in its activated condition provides connection of embedded antenna 28 to portable transceiver 40 for transmission and reception. In reception of incoming RF signals, terminal 72 of directional coupler 70 is an input port and terminal 71 a through port to provide a signal reception path to portable transceiver 40 through RF switch 61. Terminal 74 is a coupled port to provide a coupled signal reception path through switch 65 to directional coupler 80, with amplifier 76 compensating for the reduction in signal strength at coupled port 74. In directional coupler 80, terminal 81 is an input port for received RF signals and terminal 82 a through port to complete the coupled and amplified signal reception path to embedded transceiver 22. Thus, a coupled reception signal path is provided from embedded antenna 28 to embedded transceiver 22 with switch unit 60 activated. For transmission from portable transceiver 40 with switch unit 60 activated, terminal 71 is the input port and terminal 72 the through port to provide a through signal transmission path for portable transceiver 40 to embedded antenna 28. But no signal path to embedded antenna 28 is provided for embedded transceiver 22 with switch unit 60 activated.

Thus, with switch unit 60 activated, portable transceiver 40 may be connected to terminal 57 for full access to embedded antenna 28 for transmission and reception, with the advantage of a higher gain antenna in an optimal position; and the advantage in transmission may be further enhanced by the power supply connection from vehicle 20 to control and interface unit 35 providing a consistent, strong operating voltage. In reception, each of embedded transceiver 22 and portable transceiver 40 responds to calls directed to itself but not to those directed to the other, due to the separate identities of the transceivers in the telecommunications network.

When embedded transceiver 22 generates a transmission signal, terminal 82 becomes the input port of directional coupler 80. Terminal 84 thus becomes the coupled port and provides the signal, somewhat reduced but still detectable, to detector circuit 86. Detector circuit 86 thus raises its output voltage to comparator 87 to a value greater than REF and causes switch unit 60 to be switched to the inactivated switch position shown in FIG. 3. In this position, switch 61 disconnects RF terminal 57, and thus portable transceiver 40, from embedded antenna 28. In addition, embedded transceiver 22 is provided a signal transmission path through terminals 82 and 81 of directional coupler 80, armature 66 and contact 68 of RF switch 65, contact 64 and armature 62 of RF switch 61 and terminals 71 and 72 of directional coupler 70, the same path in reverse comprising a signal reception path. Portable transceiver 40, provided with means well known in the art to sense the changed impedance looking out RF line and connector 46, sees a high impedance and thus uses its own antenna 41 during the transmission. Portable transceiver 40 is restored to embedded antenna 28 at the end of the transmission when it senses a low impedance due to comparator 87 switching RF switch unit 60 back to the activated condition shown in FIG. 4.

The transmission time period of embedded transceiver 22 is likely to be short, since it is unlikely that the vehicle operator would be attempting to talk on both transceivers at the same time and the embedded transceiver transmission would therefore likely be data only. For very short embedded transceiver data transmissions such as registry in the cellular network or a short message page, the antenna change will usually not be noticed by an operator simultaneously using portable transceiver 40. Although it is possible for a call on portable transceiver 40 to be dropped, this will occur only if embedded transceiver 22 initiates a transmission of extended duration in an area of marginal communication between portable transceiver antenna 41 and the local cellular tower.

Figure 7:
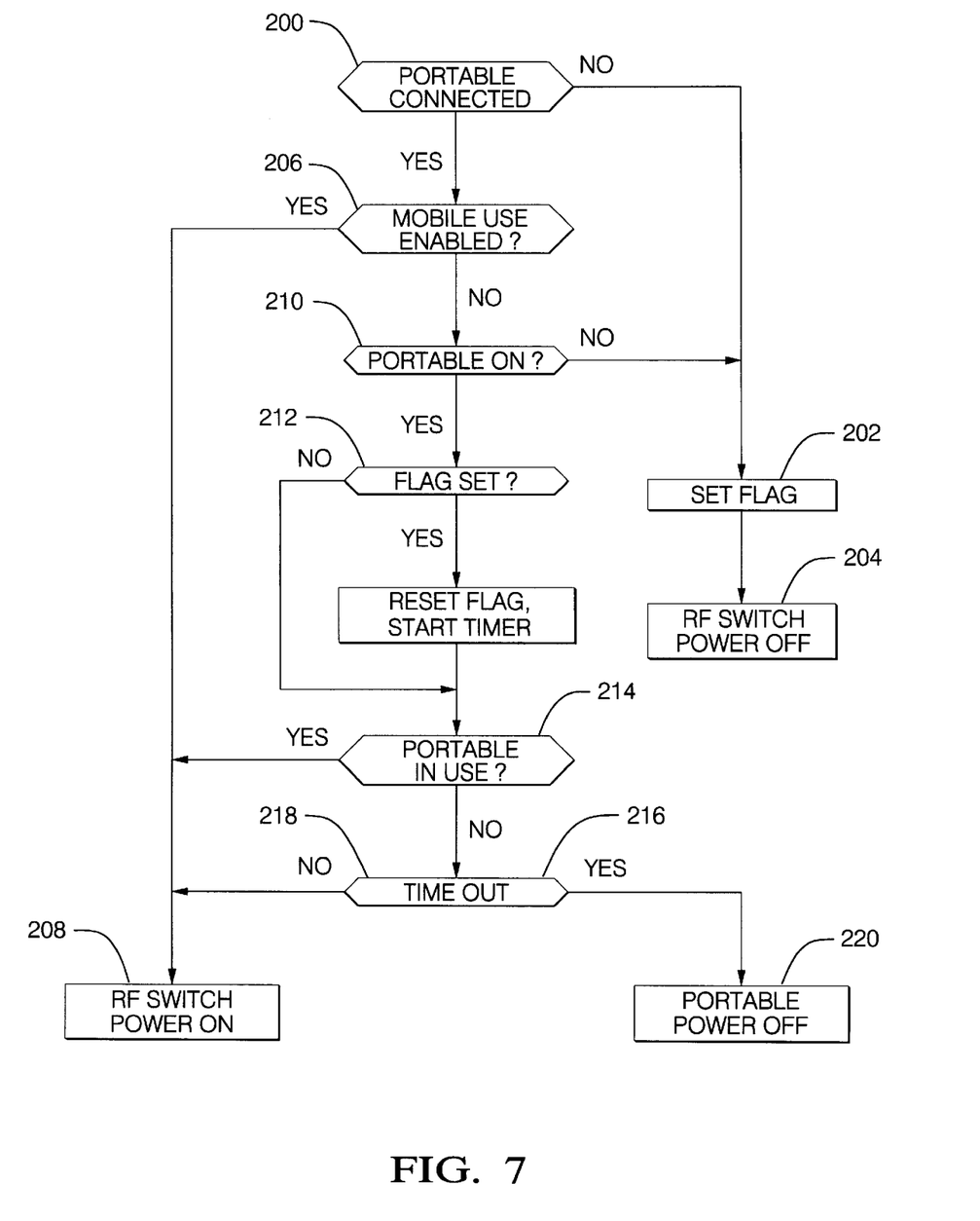
FIG. 7 shows a flow chart illustrating the operation of a control and interface unit in the apparatus of FIG. 2

The method in which control and interface unit 35 controls the application of DC electric power to RF switch 50 via terminal 54 is described with reference to the flow chart of FIG. 7. This flow chart may be understood as a portion of a program running in a computer which is part of control and interface unit 35. Generally, power is provided to RF switch 50 when portable transceiver 40 is in use or when portable transceiver 40 is connected and vehicle mobile use is activated.

The program first determines at step 200 whether portable transceiver 40 is connected. This determination is made by control and interface unit 35 through one of the power or data lines in connector 44. As previously stated, connectors 44 and 46 are physically linked or coordinated, so that both connectors 44 and 46 are connected or disconnected essentially simultaneously. Thus, the indication of a power or data connection of portable transceiver 40 to control and interface unit 35 through connector 44 also indicates an RF connection of portable transceiver 40 to embedded RF terminal 57 through RF connector 46; and such equivalent indication is also true for disconnection.

If portable transceiver 40 is not connected at step 200, a flag is set at 202 and no RF switch power is provided (step 204). If portable transceiver 40 is connected, however, the program examines the condition of mobile use switch 37 at step 206. If that switch is in its enabling condition (vehicle mobile use activated), RF switch power is provided at step 208. If switch 37 is not in its enabling condition (vehicle mobile use not activated), the program determines at step 210, through one of the power or data lines in connector 44, if portable transceiver 40 is turned on. Portable transceiver 40 has an on state, in which it is ready for use, and an off state, in which it is not; and the on/off state switching can be performed by control and interface unit 35 through the control lines of connector 44 as well as by the operator through buttons on the transceiver itself. Control and interface unit 35 is also capable of sensing the on/off state of transceiver 40 through one of the data lines of connector 44. If transceiver 40 is not turned on, the flag is set at 202 and RF switch power is not provided (step 204). But if portable transceiver 40 is turned on, the program checks the flag at step 212. A set flag indicates that portable transceiver 40 is newly turned on; and the program resets the flag and starts a timer at step 214. The timer will allow a predetermined time of, e.g. 1 minute, for the operator to initiate use of portable transceiver 40, for example by pressing a button thereon. Next, or if the flag is found to be reset at step 212, the program determines, at step 216, whether portable transceiver 40 is in use. This determination may be made from a signal provided to control and interface unit 35 by portable transceiver 40 over one of the data lines of connector 44. If portable transceiver 40 is in use, RF switch power is provided at step 208. If portable transceiver 40 is not in use, the program determines at step 218 if the timer has timed out. If timeout has not occurred, RF switch power is provided at step 208; if timeout has occurred, portable transceiver 40 is turned off at step 220.

Thus, when portable transceiver 40 is not connected, RF switch power is always off. When an operator enters vehicle 20, connects portable transceiver 40 with connectors 44 and 46, and closes an ignition or similar mobile use switch 37, power is provided to RF switch 50; and electrically controlled switch 60 is placed in its activated state to connect portable transceiver 40 to embedded antenna 28 as previously described. The power is continuously provided to RF switch 50 as long as switch 37 remains closed and portable transceiver 40 remains connected, although electrically controlled switch 60 is temporarily switched to its inactivated state whenever embedded transceiver 22 generates an RF transmission.

When portable transceiver 40 is connected and turned on without vehicle mobile use being enabled, RF switch power is provided for the predetermined time period described above to provide the vehicle operator time to initiate use of portable transceiver 40; and, if such use is initiated before timeout, the RF switch power is continued for the duration of the use. But if timeout occurs before portable use is initiated, portable transceiver 40 is turned off by control and interface unit 35; and this leads to RF switch power also being turned off in the next program cycle, assuming mobile use remains disabled. But if the operator turns on portable transceiver 40 again, another predetermined time period will be initiated. Thus, by connecting and using portable transceiver 40 within the vehicle, the vehicle operator automatically activates RF switch power to use embedded antenna 28 with portable transceiver 40 each time a portable transceiver call is initiated, even when the ignition or other vehicle mobile use switch 37 is not in its enabling condition.

When the vehicle operator causes switch 37 to be opened from its closed position, RF switch power will no longer be provided, except that it will be maintained for the duration of pre-initiated portable transceiver use. When RF switch power is no longer provided, it is removed from RF switch 50; and electrically controlled switch 60 reverts to its inactivated state. In this state, as shown in FIG. 3, a through signal path is provided between embedded transceiver 22 and embedded antenna 28 for transmission and reception. The operator may thus remove portable transceiver 40 for personal use away from vehicle 20; and the telecommunication system of vehicle 20 is set for two-way communication with MASC 15 through embedded transceiver 22. In addition, failure of RF switch 50 produces the same condition; and reporting of the failure to MASC 15 through embedded transceiver 22 is facilitated.

Figure 6:
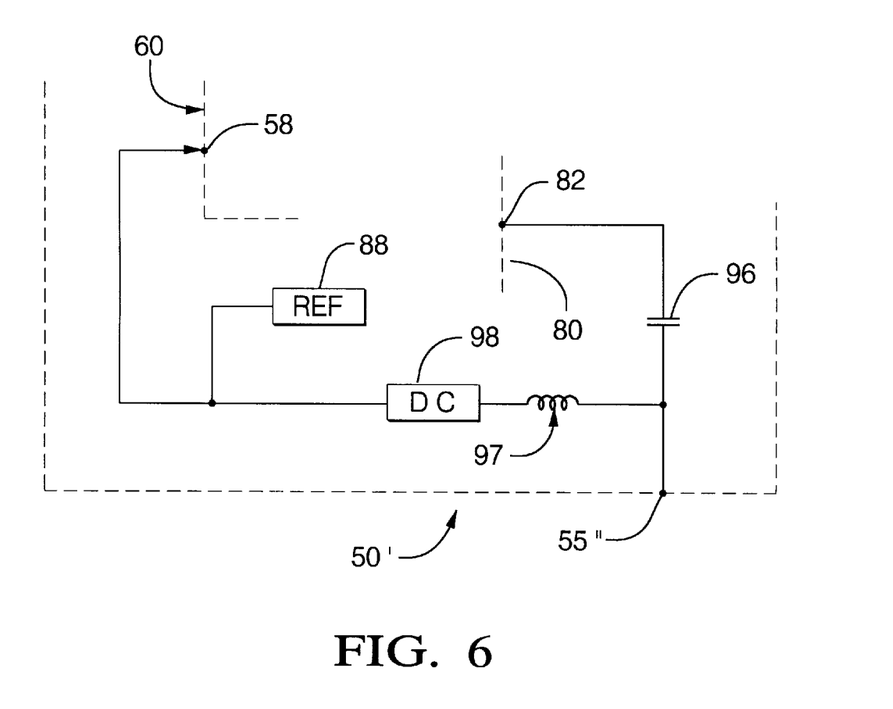
FIG. 6 shows the relevant portion of an alternative arrangement of the RF switch apparatus of FIGS. 3–4.

FIG. 6 shows a variation of RF switch 50 which eliminates terminal 54. RF switch 50' of FIG. 6 is identical to RF switch 50 of FIGS. 3 and 4 except for the relevant parts shown. DC power is provided by control and interface unit 35 through embedded transceiver 22 to terminal 55' of RF switch 50, which thus carries both DC power and RF signals. Within RF switch 50', the DC and RF signals are separated, with capacitor 96 blocking DC but providing a low impedance path at radio frequencies to terminal 82 of directional coupler 82. Inductor 97 blocks radio frequencies but provides a low impedance path at DC with a DC power conditioner 98 conditioning the DC signal applied to reference voltage generator 88, power terminal 58 and other circuitry in RF switch 50.

Figure 8:
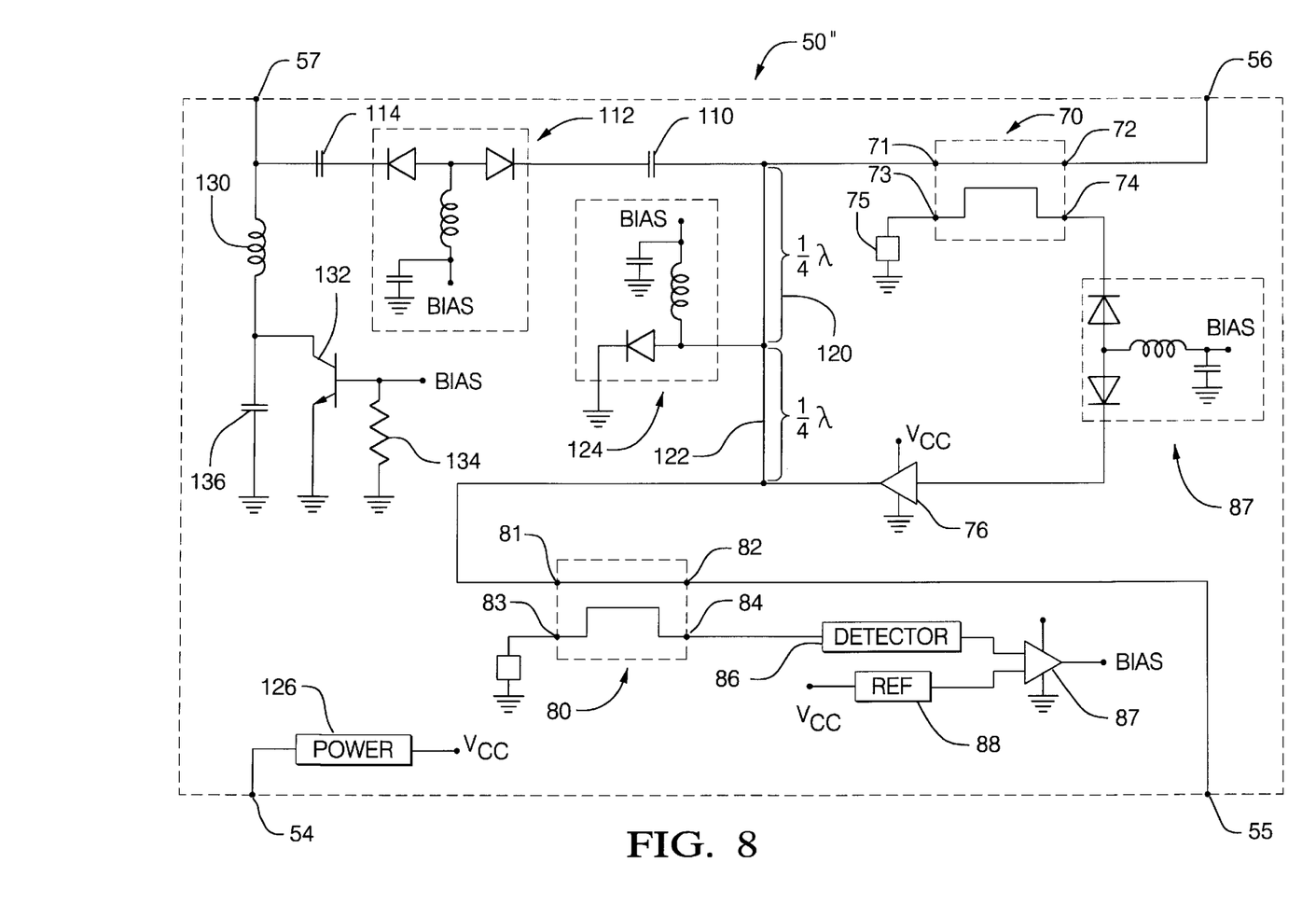
FIG. 8 shows another alternative embodiment of the RF switch apparatus of FIGS. 3–4.

FIG. 8 is a schematic diagram of an alternative RF switch apparatus 50" using PIN diode switches. Elements which are the same as those in the apparatus of FIGS. 3 and 4 are given the same reference numbers. Terminal 56 is connected through terminals 72 and 71 of directional coupler 70, a DC blocking capacitor 110, a PIN diode switch 112 and another DC blocking capacitor 114 to terminal 57. PIN diode switch 112 is a bi-directional device which exhibits a low RF impedance when provided with a bias voltage and a high RF impedance when not so provided. Terminal 74 of directional coupler 70 is connected through another PIN diode switch 116 and amplifier 76 to terminal 80 of directional coupler 80. Terminal 71 of directional coupler 70 is connected to terminal 81 of directional coupler 80 by a series pair of ¼ wavelength (¼ λ) transmission lines 120 and 122, the junction of which is connected to ground through a PIN diode switch 124. Terminal 54 is connected to power regulator circuit 126, which provides a regulated DC operating voltage Vcc. The output of comparator 87 is a signal voltage BIAS, which is provided to PIN diode switches 112, 116 and 124.

Terminal 57 is also connected through an RF blocking inductor 130 to the collector of an NPN transistor 132 having a grounded emitter and a base connected through a bias resistor 134 to ground and provided with signal voltage BIAS. The collector of transistor 132 is also connected to ground through a capacitor 136. The purpose of transistor 132 and its related elements is to control the DC impedance seen by portable transceiver 40 through terminal 57, so that portable transceiver 40 can sense when to use its own antenna 41.

When no power is applied to terminal 54, all PIN diode switches are in their high impedance state and transistor 132 is off. Terminal 57, and thus portable transceiver 40, is disconnected from terminal 56, and thus from embedded antenna 28, but sees a high input impedance at terminal 57 and thus switches to its own antenna 41. The coupled signal from terminal 74 of directional coupler 70 is not provided to embedded transceiver 22 through terminal 57. However, with PIN diode switch 124 exhibiting a high impedance, it appears as an open circuit to ¼ λ transmission lines 120 and 122, which thus provide a bi-directional RF signal path between embedded antenna 28 at terminal 56 and embedded transceiver 22 at terminal 55.

When power is provided to terminal 54, operating voltage Vcc is provided to the circuit, with reference voltage REF being provided to comparator 87. If transceiver 22 is not transmitting, detector 86 provides a low output and signal voltage BIAS is provided to all PIN diode switches and transistor 132. PIN diode switch 112 thus connects portable transceiver 40, at terminal 57, with embedded antenna 28, at terminal 56, for bi-directional RF communication. PIN diode switch 116 connects a coupled input RF signal from terminal 74 of directional coupler 70 to embedded transceiver 22 at terminal 55. PIN diode switch 124 connects the junction of ¼ λ transmission lines 120 and 122 to ground and thus prevents RF communication through transmission lines 120 and 122. Transistor 132 turns on to provide a low DC input impedance at terminal 57, so that portable transceiver 40 knows to use embedded antenna 28 rather than its own antenna 41.

When embedded transceiver 22 transmits, however, the coupled signal therefrom is provided from terminal 84 of directional coupler 80 to detector 86, and the latter exceeds the reference voltage to send signal voltage BIAS low. With BIAS low, all PIN diode switches and transistor 132 exhibit high impedances, with results equivalent to those described above with respect to no power being provided to terminal 54.

I claim:

1. A mobile vehicle telecommunication system for use in the provision of mobile application services to the vehicle from a remote location over a telecommunications network, the telecommunication system comprising, in combination:

an embedded transceiver on the vehicle;

an embedded antenna on the vehicle;

an embedded radio frequency terminal on the vehicle;

a portable transceiver having an integrated antenna and an external radio frequency terminal removably connected to the embedded radio frequency terminal in the vehicle;

electrically controlled radio frequency switch means having an activated condition connecting the embedded antenna to the embedded radio frequency terminal and an inactivated condition connecting the embedded antenna to the embedded transceiver and disconnecting the embedded antenna from the embedded radio frequency terminal;

means for coupling a received radio frequency signal from the embedded antenna to the embedded transceiver when the electrically controlled radio frequency switch means is in its activated condition;

means responsive to a radio frequency signal generated by the embedded transceiver for switching the electrically activated radio frequency switch means to its inactivated condition.

2. The telecommunication system of claim 1 further comprising means responsive to disconnection of the portable transceiver from the embedded radio frequency terminal for providing the inactivated condition of the electrically controlled radio frequency switch means.

3. The telecommunication system of claim 2 in which the vehicle has a mobile vehicle use switch having alternative enabling and disabling conditions, the telecommunication system further comprising means responsive to the mobile vehicle use switch in its enabling condition with the portable transceiver connected to the embedded radio frequency terminal for providing the activated condition of the electrically controlled radio frequency switch means.

4. The telecommunication system of claim 3 further providing means for maintaining the activated condition of the electrically controlled radio frequency switch means after the mobile vehicle use switch is placed in its disabling condition as long as the mobile transceiver remains connected to the embedded radio frequency terminal and in use initiated before the mobile vehicle use switch is placed in its disabling condition.

5. The telecommunication system of claim 2 in which the portable transceiver has operator selectable on and off states, the system further comprising means for providing the activated condition of the electrically controlled radio frequency switch means for a predetermined time period following connection of the portable transceiver to the embedded radio frequency terminal and selection by the operator of the portable transceiver on state.

6. The telecommunication system of claim 5 further comprising means for maintaining the activated condition of the electrically controlled radio frequency switch means as long as the mobile transceiver remains connected to the embedded radio frequency terminal and in use initiated prior to the termination of the predetermined time period.

7. The telecommunication system of claim 1 in which the means for coupling a received radio frequency signal from the embedded antenna to the embedded transceiver comprises a directional coupler for coupling the received radio frequency signal from the embedded antenna and an additional electrically controlled radio frequency switch means controlled together with the electrically controlled radio frequency switch means of claim 1 and having an activated condition providing the coupled signal from the directional coupler to the embedded transceiver and an inactivated condition not providing the coupled signal from the directional coupler to the embedded transceiver.

8. The telecommunication system of claim 7 in which the means responsive to a radio frequency signal generated by the embedded transceiver for switching the electrically activated radio frequency switch means to its inactivated condition comprises an additional directional coupler coupling signals only from the embedded transceiver to a detector.

* * * * *